United States Patent
Yanagida et al.

(10) Patent No.: US 12,128,912 B2
(45) Date of Patent: Oct. 29, 2024

(54) VEHICLE CONTROL DEVICE

(71) Applicant: HONDA MOTOR CO., LTD., Tokyo (JP)

(72) Inventors: Hisanori Yanagida, Tokyo (JP); Takuro Shimizu, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 200 days.

(21) Appl. No.: 17/947,413

(22) Filed: Sep. 19, 2022

(65) Prior Publication Data

US 2023/0097944 A1   Mar. 30, 2023

(30) Foreign Application Priority Data

Sep. 30, 2021   (JP) .................. 2021-162004

(51) Int. Cl.
*B60W 50/038*   (2012.01)
*B60W 30/14*   (2006.01)
*B60W 50/02*   (2012.01)

(52) U.S. Cl.
CPC ........ *B60W 50/038* (2013.01); *B60W 30/146* (2013.01); *B60W 50/0205* (2013.01)

(58) Field of Classification Search
CPC ............. B60W 50/038; B60W 30/146; B60W 50/0205
USPC .......................................................... 701/93
See application file for complete search history.

(56) References Cited

U.S. PATENT DOCUMENTS

2013/0304310 A1* 11/2013 Inada ..................... G07C 5/006
                                                          701/31.9
2016/0200297 A1*  7/2016 Yasutomi .................. B60T 7/12
                                                          701/70
2017/0151960 A1   6/2017 Fujiki et al.
2018/0348769 A1* 12/2018 Sato ...................... B60W 30/02
2019/0092321 A1   3/2019 Shimizu et al.

FOREIGN PATENT DOCUMENTS

| EP | 1104731 A2 * | 6/2001 | ............ B60T 8/1766 |
| JP | 2003276587 A | 10/2003 | |
| JP | 2003327011 A | 11/2003 | |
| JP | 2004168257 A * | 6/2004 | |
| JP | 2009101714 A | 5/2009 | |
| JP | 5013312 B2 | 8/2012 | |
| JP | 2017094992 A | 6/2017 | |
| JP | 2019059299 A | 4/2019 | |

OTHER PUBLICATIONS

Notice of Reasons for Refusal for Japanese Patent Application No. 2021-162004 dated Feb. 14, 2023; 5 pp.

* cited by examiner

*Primary Examiner* — Isaac G Smith
(74) *Attorney, Agent, or Firm* — Armstrong Teasdale LLP

(57) ABSTRACT

In case a vehicle speed control is performed in response to a failure in a steer-by-wire steering system, the vehicle is prevented from accelerating following a speed reduction caused by a braking operation of the vehicle operator. The speed limit control limits a traveling speed of the vehicle below an upper limit speed upon detecting a fault in the steering system, and is configured to set a target deceleration of the vehicle according to the limited traveling speed, perform a deceleration control to bring an actual deceleration of the vehicle to become near the target deceleration, and restrict the actual deceleration from changing to an acceleration side in the deceleration control.

2 Claims, 7 Drawing Sheets

VEHICLE CONTROL DEVICE

TECHNICAL FIELD

The present invention relates to a control device for controlling a steer-by-wire steering system provided in a vehicle.

BACKGROUND ART

In a steer-by-wire steering system, the steering wheel that is operated by the driver and the rack that steers the road wheels are mechanically separated from each other. The steering angle of the steering wheel is detected by a steering angle sensor, and the road wheels are steered by a steering actuator according to the steering angle.

In such a steer-by-wire steering system, redundancy is provided to increase reliability, but if redundancy is lost due to a failure in the system, steering may become difficult if the system is continued to be used under such a condition. For this reason, in case of an abnormal situation that causes or may likely to cause loss of redundancy, it is necessary to quickly move the vehicle to a safe location such as the shoulder of the road.

As a technology for controlling the vehicle in case of a failure in a steer-by-wire steering system, it is conventionally known to reduce electric power consumption by limiting the traveling speed of the vehicle in case of a failure in the power generator so that an adequate electric power may be ensured to the steering system for the vehicle operator to move the vehicle to a safe location by steering operation. See JP5013312B2, for instance.

In limiting the traveling seed of the vehicle as a countermeasure for a fault in the steer-by-wire steering system, if the vehicle speed is simply limited to a certain upper limit speed, and the driver applies the brakes, the brake operation temporarily decelerates the vehicle, but the vehicle may thereafter accelerate toward the upper limit speed. For example, when the upper limit vehicle speed is set to 15 Km/h, and the vehicle speed is reduced to 10 Km/h by the driver's braking operation, there is room for acceleration to 15 Km/h. However, such an acceleration of the vehicle is not desirable as a part of an emergency control, and the driver may experience some discomfort as a result of such an acceleration of the vehicle.

SUMMARY OF THE INVENTION

In view of such a problem of the prior art, a primary object of the present invention is to provide a vehicle control device which in case a vehicle speed control is performed in response to a failure in a steer-by-wire steering system, the vehicle is prevented from accelerating following a speed reduction caused by a braking operation of the vehicle operator.

To achieve such an object, the present invention provides a vehicle control device configured to be mounted on a vehicle provided with a steering system including an operating member configured to be operated by a driver, a steering member mechanically separated from the operating member and configured to steer a road wheel, and a steering actuator powered by electric power supplied from an onboard power source and configured to actuate the steering member according to an input from the operating member, wherein the control device is configured to perform a speed limit control to limit a traveling speed of the vehicle below an upper limit speed upon detecting a fault in the steering system, and the speed limit control is configured to set a target deceleration of the vehicle according to the limited traveling speed, perform a deceleration control to bring an actual deceleration of the vehicle to become near or close to the target deceleration, and restrict the actual deceleration from changing to an acceleration side in the deceleration control.

Thus, when a fault occurs to the steering system in which the operating member is mechanically separated from the steering member as in the case of a steer-by-wire steering system, and a vehicle speed limit control is performed, the resulting deceleration control restricts the actual deceleration of the vehicle from being on the acceleration side. Therefore, when the driver performs a brake operation and discontinues the brake operation, the vehicle is prevented from accelerating following the discontinuation of the brake operation.

Preferably, the deceleration control is performed as a feedback control including an integral term, and the target deceleration for the feedback control is set as an initial value of the integral term when starting the feedback control.

Thereby, the time period required for the actual deceleration to converge to the target deceleration is shortened at the start of feedback control so that responsiveness is improved.

Preferably, the deceleration control is performed as a feedback control including an integral term, and the integral term is prevented from changing to an acceleration side in the feedback control.

Thereby, accumulation of the integral term in the feedback control is suppressed so that the time period required for the actual deceleration to converge to the target deceleration is shortened, and the responsiveness is improved. In this case, by setting the lower limit of the integral term in the feedback control near the target deceleration, the integral term is prevented from changing to the acceleration side.

Preferably, the deceleration control is performed as a feedback control including an integral term, and the target deceleration for the feedback control is set to the integral term when the deceleration of the vehicle by a brake operation of driver becomes greater than the target deceleration, Thereby, accumulation of the integral term in the feedback control is suppressed so that the time period required for the actual deceleration to converge to the target deceleration when transitioning from the control by a driver's operation to the feedback control.

The present invention thus provides a vehicle control device which in case a vehicle speed control is performed in response to a failure in a steer-by-wire steering system, the vehicle is prevented from accelerating following a speed reduction caused by a braking operation of the vehicle operator.

DESCRIPTION OF THE PREFERRED EMBODIMENT(S)

A preferred embodiment of the present invention will be described in the following with reference to the appended drawings.

Figure 1:
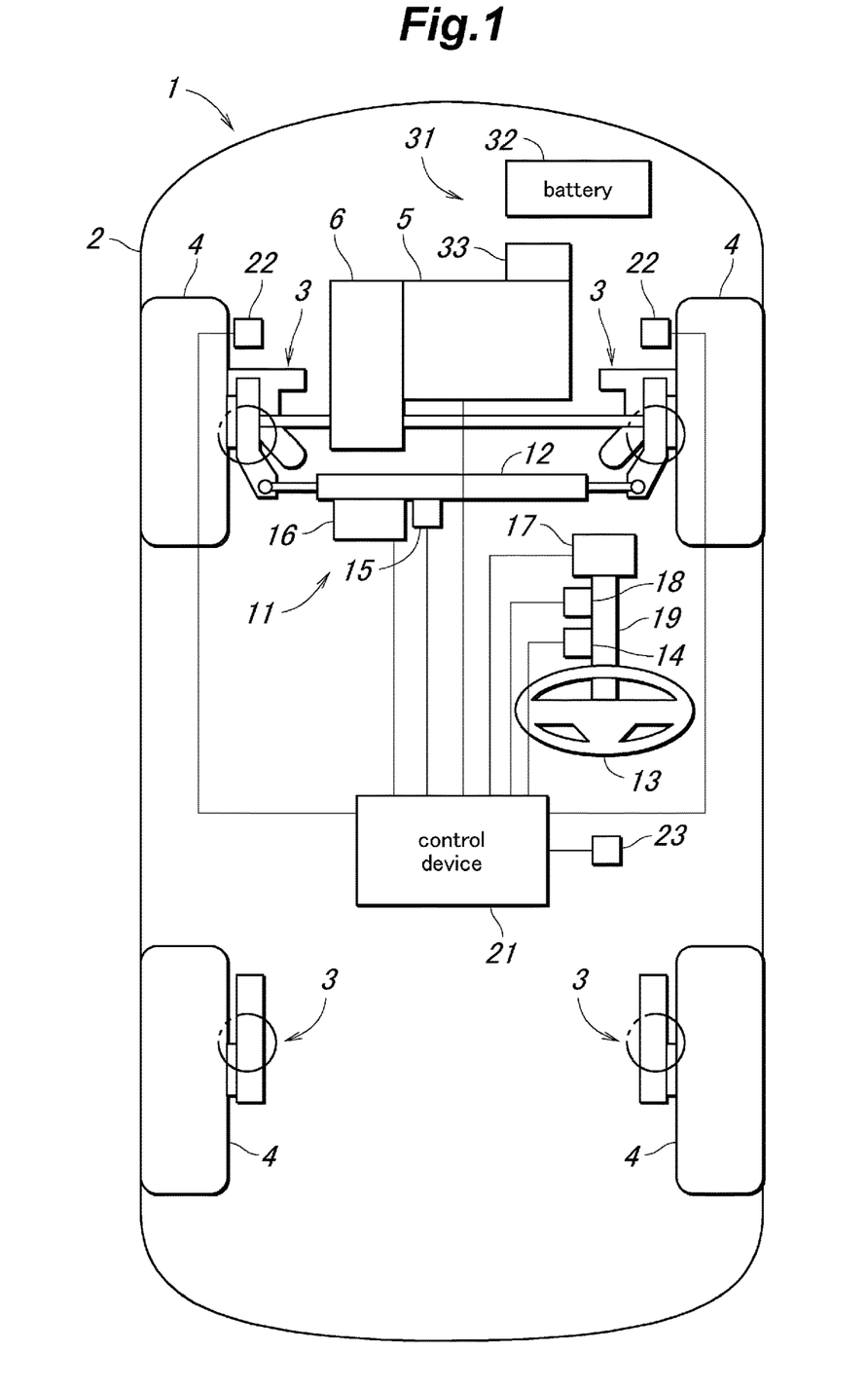
FIG. 1 is a schematic diagram of a vehicle equipped with a control device according to an embodiment of the present invention.

FIG. 1 is a schematic diagram of a vehicle 1 equipped with a steering system 11 according to an embodiment of the present invention. The vehicle 1 consists of a four-wheel vehicle having four road wheels 4 supported by a vehicle body 2 via respective suspension devices 3.

The vehicle 1 includes a power plant 5 that drives the road wheels 4 and a transmission 6 that allows the mode of transmitting the driving force from the power plant 5 to the road wheels 4 to be changed. The power plant 5 is at least one of an internal combustion engine and an electric motor, and the driving force and braking force (engine brake) of the power plant 5 are transmitted to the road wheels 4. The power plant 5 is controlled according to the driver's accelerator pedal operation. Also, the transmission 6 is controlled according to the driver's shift operation.

The vehicle 1 is provided with a steer-by-wire steering system 11 that steers the road wheels 4. The steering system 11 includes a rack 12 (steering member), a steering wheel 13 (operating member), a steering angle sensor 14, a steered angle sensor 15, a steering actuator 16 (steering device), a reaction force actuator 17 (reaction device) and a steering torque sensor 18. The steering system 11 is a shaftless steer-by-wire steering system in which the rack 12 and the steering wheel 13 are not mechanically connected or mechanically separated from each other.

The steering wheel 13 is operated by the driver. The steering angle sensor 14 detects the steering angle of the steering wheel 13. The steered angle sensor 15 detects the steered angle of the road wheels 4 typically via the displacement of the rack 12. The steering actuator 16 pushes and pulls the rack 12 to steer the road wheels 4. The reaction force actuator 17 applies to the steering wheel 13 a reaction force against the driver's operation force. The steering torque sensor 18 detects the steering torque applied to the steering shaft 19.

The vehicle 1 is further provided with a control unit 21 (ECU), a vehicle speed sensor 22 (driving condition detection means, vehicle speed detection means), and an acceleration sensor 23 for detecting the fore and aft deceleration of the vehicle. The control unit 21 includes a processor, memory, and the like, and controls the operation of the steering actuator 16, the reaction force actuator 17, and the like according to the detection results of sensors such as the steering angle sensor 14, the steered angle sensor 15, the steering torque sensor 18, the vehicle speed sensor 22, and the acceleration sensor 23.

The vehicle 1 is further provided with a power supply system 31 that supplies electric power to the steering system 11, the control unit 21, and the like. This power supply system 31 includes a battery 32 (power storage device), a power generator 33, and the like.

In addition, the vehicle 1 is provided with a brake system (braking device) (not shown in the drawings) that applies brake to the road wheels 4. This brake system is controlled according to the driver's braking operation.

The steering system 11 is incorporated with a system redundancy in order to improve reliability. For example, the steering actuator 16 (steering device) may have redundancy consisting of including two systems. Further, the reaction force actuator 17 (reaction force device) may also have redundancy consisting of including two systems. Also, the control unit 21 may have redundancy consisting of including two systems. Also, the power supply system 31 may have redundancy consisting of including two systems.

Next, the control action of the vehicle system will be discussed in the following with reference to FIG. 2 which is a flowchart showing the operation procedure of the control unit 21 in this vehicle system.

When using the steer-by-wire steering system 11, there is a possibility that the steering system 11 becomes unable to operate correctly while the vehicle is traveling due to a failure in the steering system 11 itself or in the power supply system 31 that supplies electric power to the steering system 11. Therefore, in the present embodiment, a vehicle speed limit control is performed in order to ensure a safe state by limiting the vehicle speed so that the steering operation may not become difficult for the vehicle operator. More specifically, in this embodiment, the vehicle speed limit control can be performed in three different modes (escape vehicle speed limit control, forced vehicle speed limit control, and maximum speed limit control).

Figure 2:
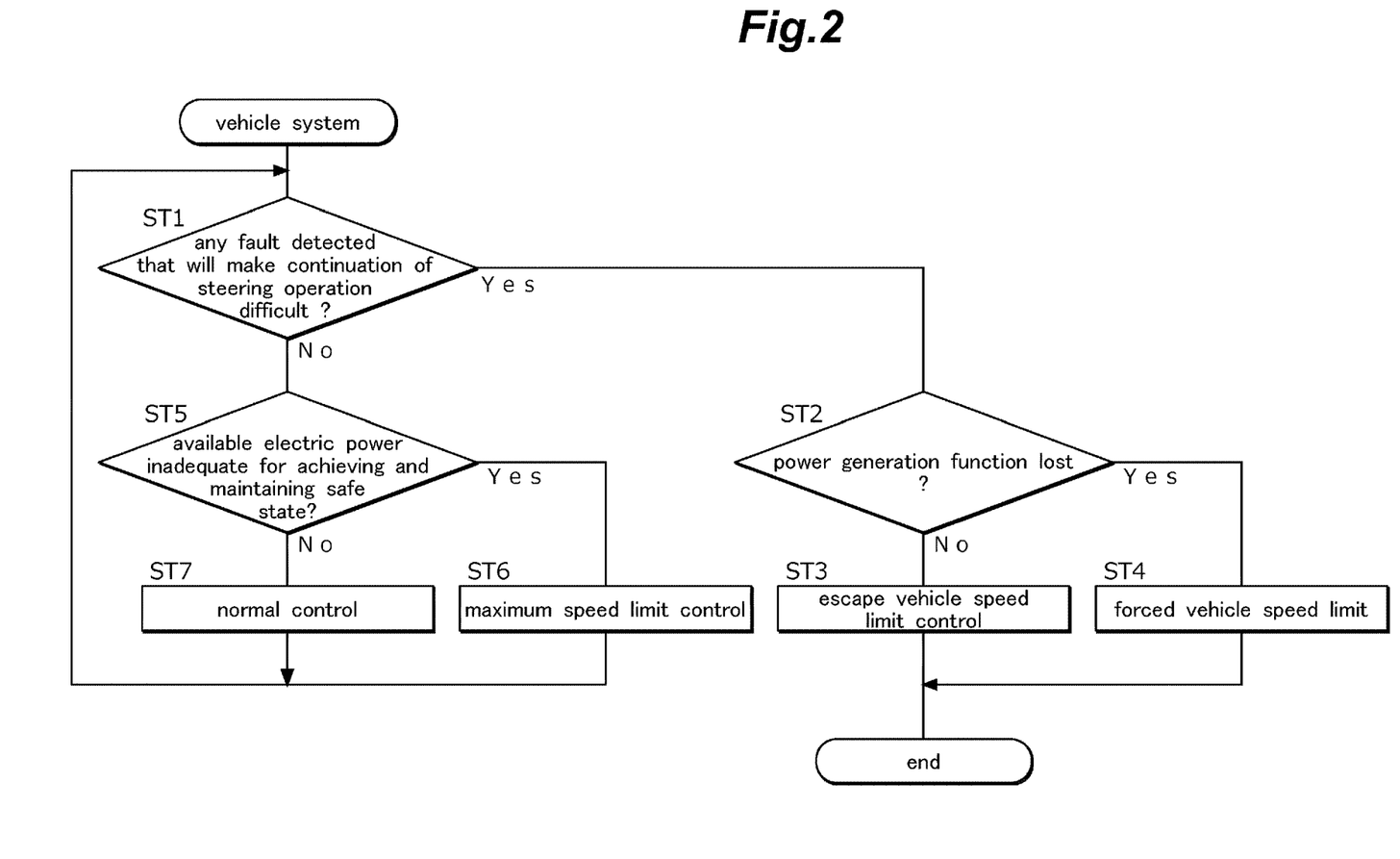
FIG. 2 is a flowchart showing mode of operation of the control device.

As shown in FIG. 2, when the vehicle system is activated, the control unit 21 first determines if any fault is detected that will make the continuation of steering operation difficult (step ST1). A fault in the vehicle system may include the loss of redundancy in the steering system 11, a reduction in the output of the steering actuator 16, and the incapability of the power generator 33 to supply adequate power to the steering actuator (power generation function failure).

If any fault is detected that will make the continuation of steering operation difficult (ST1: Yes), the control unit 21 determines if the power generation function is lost (step ST2).

Here, if the power generation function is not lost, or, in other words if the redundancy of the steering system 11 is lost, or the output of the steering actuator 16 is insufficient (ST2: No), the escape vehicle speed limit control is performed (step ST3). The escape vehicle speed limit control is continued until the ignition is turned on once again.

On the other hand, if the power generation function is lost (ST2: Yes), the forced vehicle speed limit control is performed (step ST4). The forced vehicle speed limit control is continued until the ignition is turned on once again.

If there is not a failure that makes the continuation of steering operation difficult (ST1: No), it is determined if there is an inadequacy of available electric power for achieving and maintaining a safe state or a state where the vehicle is traveling at a safe speed the permits the vehicle to be stopped immediately (step ST5). More specifically, it is determined if the output of the battery 32 is inadequate due to deterioration or low temperature.

If the amount of available electric power is inadequate to achieve and maintain a safe state (ST5: Yes), the maximum speed limit control is performed (step ST6).

On the other hand, if the amount of electric power required to achieve and maintain a safe state is not insufficient (ST5: No), none of the vehicle speed limit control (escape vehicle speed limit control, forced vehicle speed limit control, and maximum speed limit control) is executed, and the normal control is maintained (step ST7).

Figure 3A:
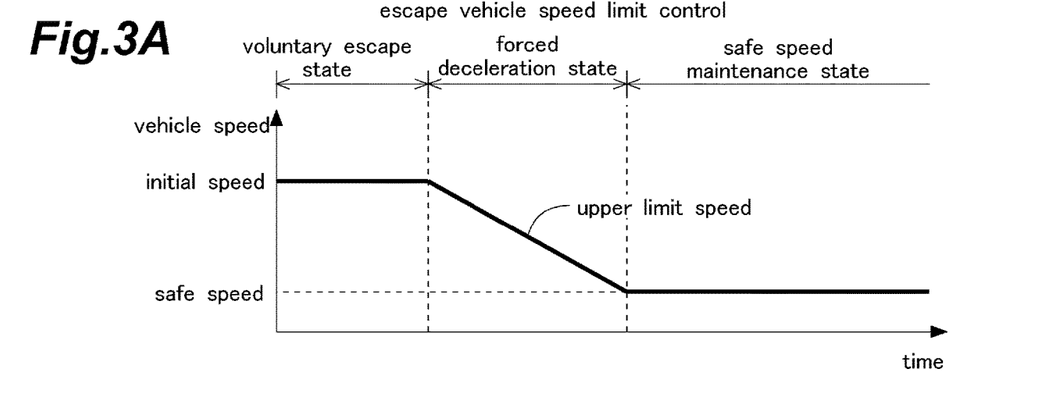
FIGS. 3A to 3C are graphs illustrating a mode of operation of the control device.
Figure 3B:
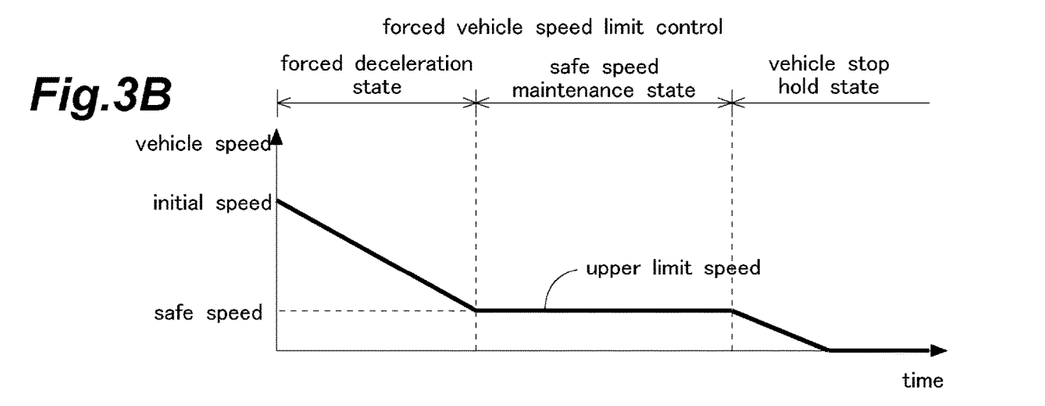
Figure 3C:
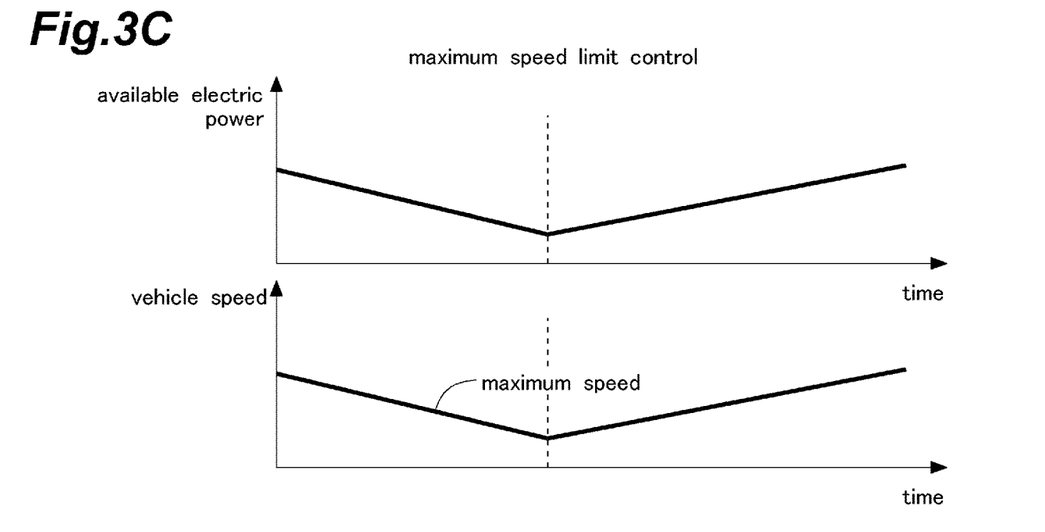

Next, the vehicle speed limit control performed by the control unit 21 will be described in the following. FIGS. 3A to 3C show an outline of the vehicle speed limit control performed by the control unit 21.

The control unit 21 performs the vehicle speed limit control in one of the three different modes (the escape vehicle speed limit control, forced vehicle speed limit control, and maximum speed limit control) according to the nature of the failure of the vehicle system.

FIG. 3A shows an example of the escape vehicle speed limit control which is performed when there is a failure that makes the continuation of steering operation difficult, but the power generator 33 is able to adequately supply electric power (not the case of the power generation function lost state). In other words, this mode is performed when the redundancy of the steering system 11 is lost or when the output of the steering actuator 16 is insufficient.

The escape vehicle speed limit control sequentially transitions from a first to a third speed limit states (voluntary escape state, forced deceleration state, and safe speed maintenance state).

In the voluntary escape state, while a driving of the vehicle at an improperly high speed is restricted by setting a fixed upper limit speed, the driver is allowed to voluntarily or actively escape from the current state. More specifically, the upper limit speed is set to the higher of the vehicle speed at the time of detecting the failure and the speed limit of the road on which the vehicle is traveling, and the vehicle is prevented from traveling at a higher speed than this upper limit speed. The vehicle can be accelerated and decelerated relatively freely, and lane changes can be made as long as the upper limit speed is not exceeded. Therefore, the vehicle driver is enabled to move the vehicle to a safe location by means of steering operation. The voluntary escape state may be continued for a certain period of time which may allow the driver to move the vehicle to a safe place. Thus, the driver is given with some freedom in operating the vehicle. If the vehicle is not brought to a stop or to a safe location within a prescribed time period, the forced deceleration is initiated.

In the forced deceleration state, the vehicle is forcibly decelerated to a safe speed by progressively lowering the upper limit speed. More specifically, the upper limit speed is progressively decreased from the initial speed (or the upper limit speed in the voluntary escape state) to a predetermined safe speed. The safe speed is selected as a speed at which the vehicle can be promptly and safely brought to a stop by deceleration achieved by the driver's braking operation without requiring steering operation. The upper limit speed of the forced deceleration state is selected as a speed at which the vehicle travels when the driver does not operate either the accelerator or brake pedal. Preferably, the deceleration of the vehicle in this state should be low enough for the driver to calmly perform steering operation. For instance, the deceleration may be achieved solely by the braking force of the power plant 5. This braking force may include regenerative and/or frictional braking forces, in addition to the braking force of engine brake. Owing to this control action, the vehicle can be decelerated to the safe speed within a predetermined time period without requiring the driver to operate the brake. In the forced deceleration state, if the vehicle speed is near the upper limit speed, acceleration of the vehicle by the driver's accelerator pedal operation is prohibited, but deceleration of the vehicle by the driver's brake pedal operation is permitted.

In the safe speed maintenance state, the upper limit speed is set to the safe speed, and the vehicle speed is limited to the upper limit speed. Owing to this control action, the driver can drive the own vehicle at a speed below the safe speed until an appropriate safe location is reached, and can stop the own vehicle by operating the brake at an appropriate timing. Therefore, even if the steering operation is abruptly disabled or otherwise becomes difficult, the driver can safely bring the vehicle to a stop by operating the brake pedal.

In the escape vehicle speed limit control, the driver is prompted to perform an escape operation or in other words to move the own vehicle to a safe location such as a road side curb or the like without any undue delay. In particular, in the forced deceleration state, the driver is prompted to perform a forced deceleration by a visual display or a sound output. Due to a high level of urgency, and to ensure that the vehicle is properly decelerated, the driver may be continually warned to decelerate the vehicle. Further, in the safe speed maintenance state, the driver may be promoted to stop the vehicle at a safe place by means of a visual display or a sound output. In this case, due to a reduced level of urgency, the warning may be issued in an intermittent manner.

The forced vehicle speed limit control shown in FIG. 3B is performed when there is a failure that will make steering difficult for the vehicle to continue to travel; for instance, when the power generator 33 becomes unable to supply electric power (power generation function lost state).

The forced vehicle speed limit control sequentially transitions from a first to a third speed limit state (forced deceleration state, safe speed hold state, and vehicle stop hold state). In the forced vehicle speed limit control, there is no voluntary escape state as opposed to the case of the escape vehicle speed limit control (see FIG. 3A), and deceleration is immediately started in the forced deceleration state.

The forced deceleration state and the safe speed hold state are similar to the respective counterparts in the escape vehicle speed limit control (see FIG. 3A). It should be noted that in the forced deceleration state, the vehicle speed of the own vehicle at the time of a failure detection becomes the initial speed.

In the vehicle stop hold state, the own vehicle is forcibly brought to a stop by a speed limit action that progressively lowers the upper limit speed. The control action may include prompting the driver to brake the vehicle to bring the vehicle to a stop. Once the vehicle is brought to a stop, the EPB (electric parking brake) and/or the parking position of the transmission 6 are employed to keep the vehicle stationary. Owing to this control action, the own vehicle can be decelerated to a complete stop, and held stationary in a reliable manner while the available electric power permits this to be performed.

In addition, in the forced vehicle speed limit control, the driver is notified that the vehicle speed will be limited due to loss of power generation function. In particular, in the vehicle stop hold state, as in the forced deceleration state, the driver may be notified of the intervention of the vehicle stop measures by visual display on the display, voice output, or the like, similarly as in the case of forced deceleration state. In this case, due to a high level of urgency, the warning may be provided continuously.

The maximum speed limit control shown in FIG. 3C is performed when there is no failure that will cause steering operation to be difficult in any foreseeable future, but the supply of electric power is not adequate for achieving a safe state or maintaining a safe state.

In the maximum speed limit control, the maximum speed (upper limit speed) is set according to the vehicle's power status (available electric power and power consumption), and the vehicle speed is controlled to be below a predetermined maximum speed. More specifically, on the assumption that the power consumption is constant, the maximum speed decreases as the available power decreases, and the maximum speed increases as the available power increases. Owing to this control action, an adequate amount of electric power required to achieve and maintain a safe state is ensured so that the own vehicle can be safely brought to a stop.

In the maximum speed limit control, it may be arranged such that the driver is notified of the vehicle speed to be limited owing to the reduction in the available electric power by a visual and/or auditory warning.

Figure 4:
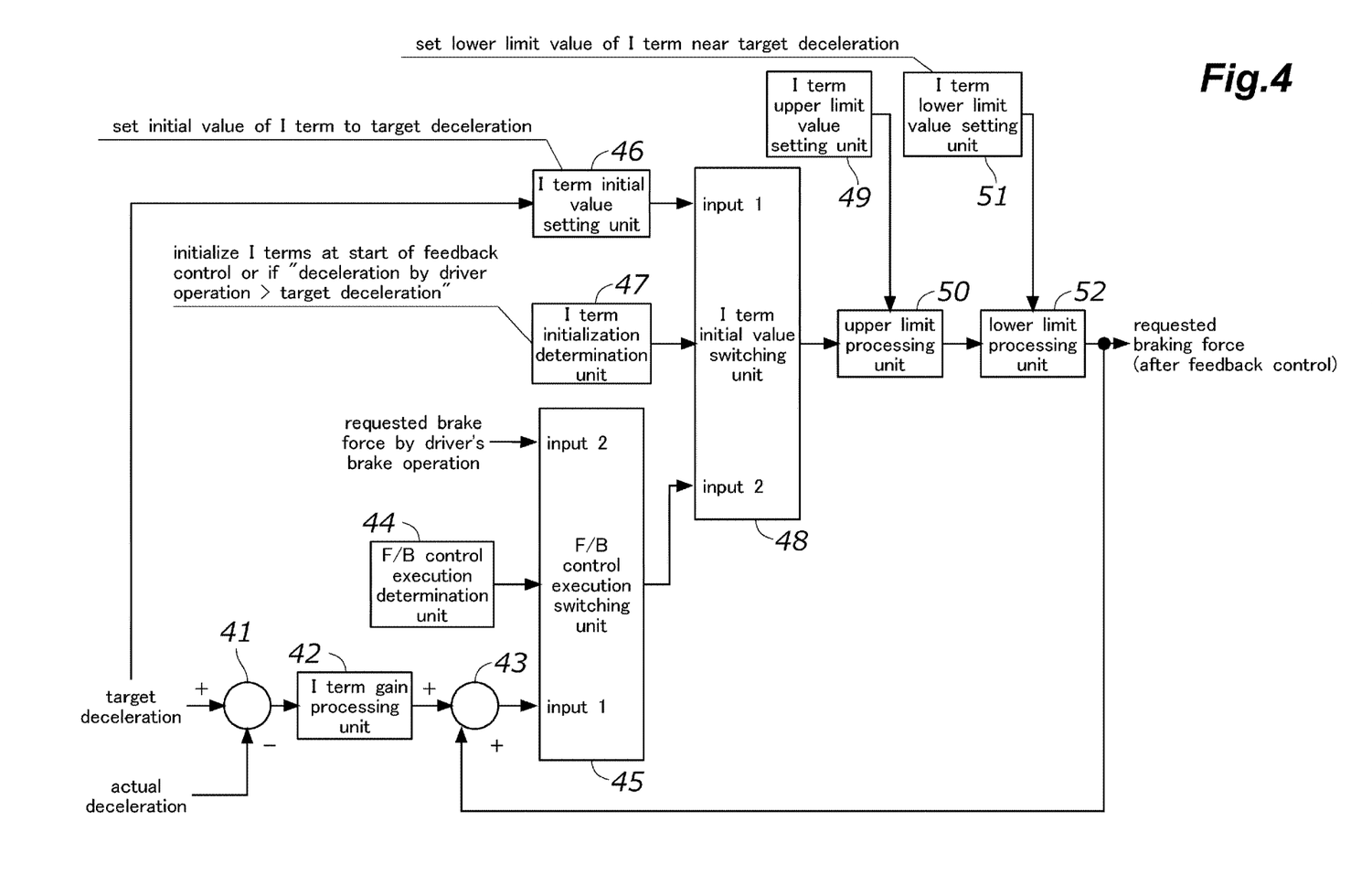
FIG. 4 is a block diagram of the control device.

The feedback control performed by the control unit 21 will be described in the following. FIG. 4 is a block diagram showing an outline of the feedback control performed by the control unit 21.

In the vehicle speed limit control, the control unit 21 sets a target deceleration based on the vehicle speed which is limited, and performs a feedback control (deceleration control) so that the actual deceleration is brought near or close to the target deceleration.

A subtractor 41 in the control unit 21 subtracts the actual deceleration from the target deceleration. The actual deceleration can be measured by the acceleration sensor 23 (see FIG. 1) or the like. An integral term gain processing unit 42 calculates an integral term (I term) by integrating the difference between the target deceleration and the actual deceleration outputted from a subtractor 41, and multiplying the result by a gain. An adder 43 adds the deviation in deceleration outputted from the integral term gain processing unit 42 and the requested braking force or the previous feedback deceleration (manipulated amount) to calculate the current feedback deceleration.

A F/B control execution determination unit 44 determines if a feedback control is possible. A F/B control execution switching unit 45 switches between the first input and the second input according to the determination result of the F/B control execution determination unit 44. More specifically, the first input, or the feedback deceleration output from the adder 43 is selected when the feedback control is to be performed, and the second input, or the brake force requested by the driver's braking operation is selected when feedback control is not to be performed.

An initial value of the integral term is set in an integral term initial value setting unit 46. In this embodiment, the target deceleration is set as the initial value of the integral term. An integral term initialization determination unit 47 determines if the integral term is to be initialized. In the present embodiment, it is determined that the integral term is to be initialized when feedback control is started. Also, when the deceleration due to the driver's braking operation becomes larger than the target deceleration, it is determined that the integral term is to be initialized. The integral term initial value switching unit 48 switches between the first input and the second input according to the determination result of the integral term initialization determination unit 47. More specifically, when the integral term is to be initialized, the first input, or in other words, the initial value of the integral term (target deceleration) outputted from the integral term initial value setting unit 46 is selected. Conversely, when the initialization of the integral term is not to be performed, the second input, or the feedback deceleration output from the F/B control execution switching unit 45 or the braking force requested by the driver's brake operation is selected.

The integral term upper limit value setting unit 49 sets an integral term upper limit value. An upper limit processing unit 50 performs a process for limiting the deceleration according to the upper limit value of the integral term outputted from the integral term upper limit value setting unit 49. An integral term lower limit value setting unit 51 sets an integral term lower limit value. In this embodiment, the lower limit value of the integral term is set as a value near or close to the target deceleration in order to limit the change of the integral term to the acceleration side due to the driver's braking operation. The lower limit processing unit 52 performs a process for limiting the deceleration according to the lower limit value of the integral term outputted from the integral term lower limit value setting unit 51, and outputs the requested braking force.

Next, the control action performed by the control unit 21 will be described in the following with reference to FIGS. 5A, 5B, 6A, 6B, 7A and 7B which show graphs illustrating the control action performed by the control unit 21. FIGS. 6A and 7A are identical to FIG. 5A.

Figure 5A:
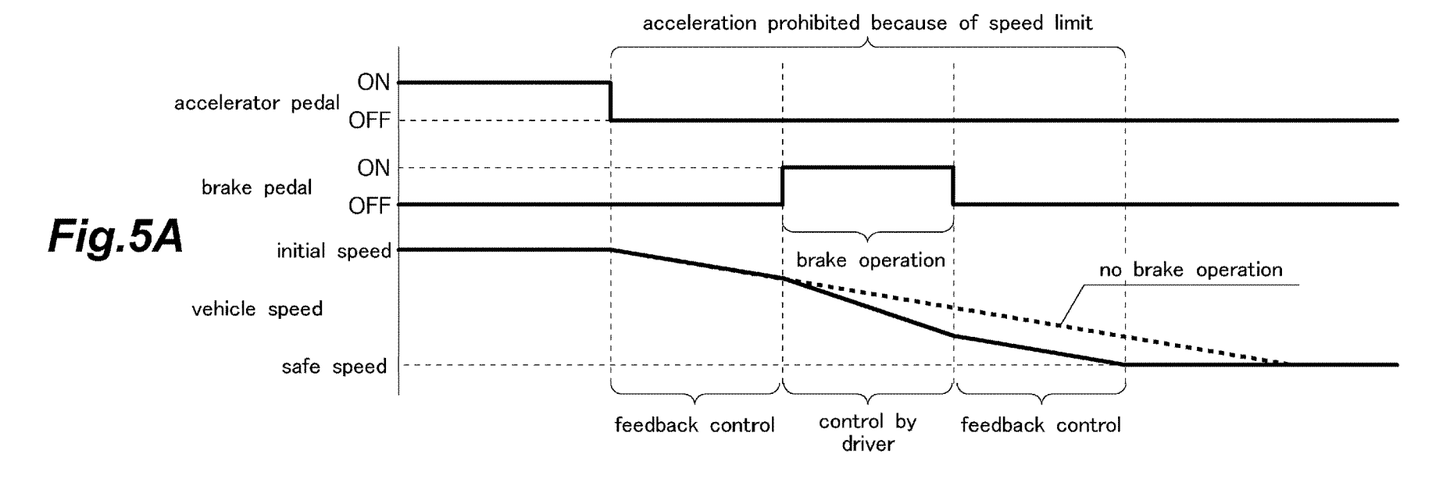
FIGS. 5A and 5B are graphs showing a mode of operation of the control device.
Figure 6A:
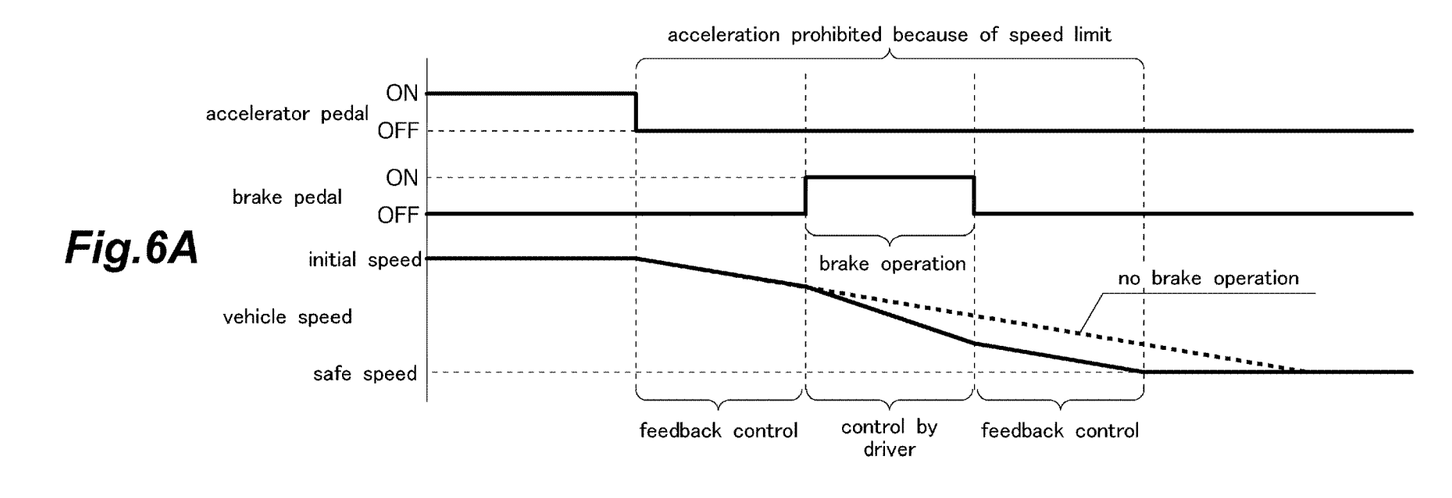
FIGS. 6A and 6B are graphs showing another mode of operation of the control device.

As shown in FIG. 5A, when the vehicle speed limit control is started, the control unit 21 prohibits acceleration, and keeps the accelerator operation signal off so that the vehicle speed progressively decreases from the initial speed to the safe speed. If the driver operates the brake pedal during this process, the vehicle speed decrease even further than by the normal vehicle speed limit control alone.

Figure 5B:
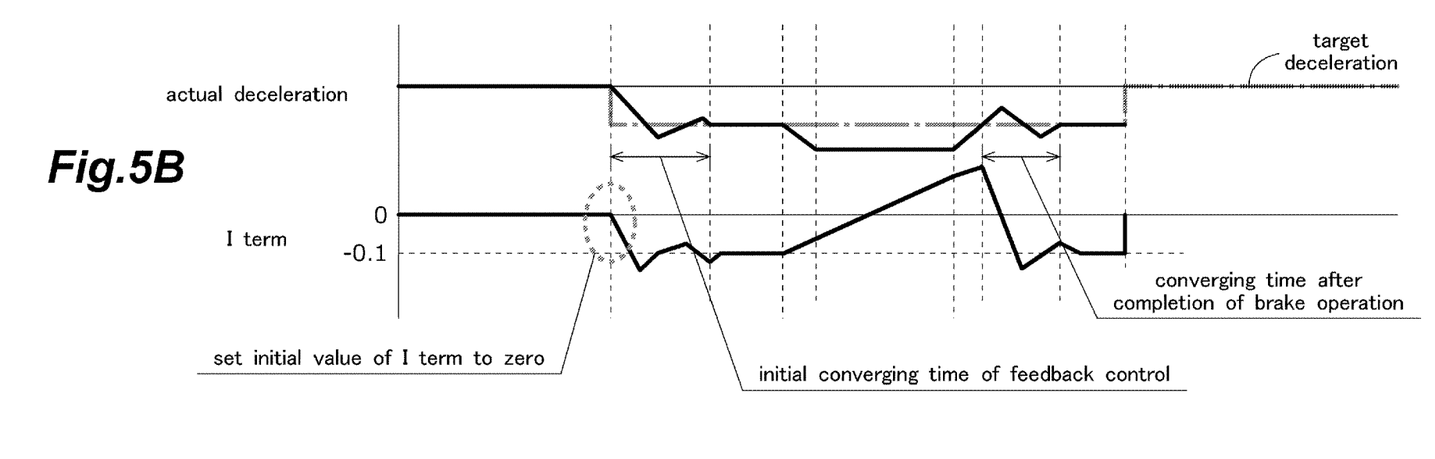

The example shown in FIG. 5B is a case where neither the control of the initial value of the integral term at the start of the feedback control nor the control for limiting the integral term is performed. In this case, since the initial value of the integral term is set to 0 at the start of the feedback control, it requires some time period for the integral term to accumulate so that the time period required for the actual deceleration to converge to the target deceleration is extended with the result that the responsiveness is impaired. In addition, when switching between the control by the driver's operation and feedback control, a certain time period is required to cancel the accumulation of the integral term with the result that the responsiveness is impaired.

Figure 6B:
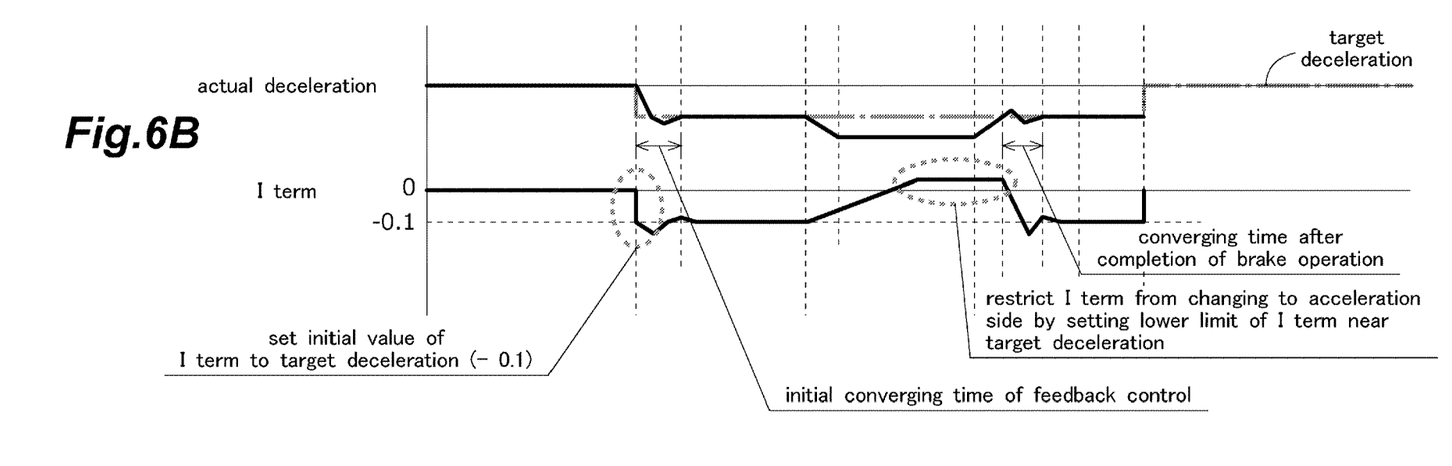
Figure 7A:
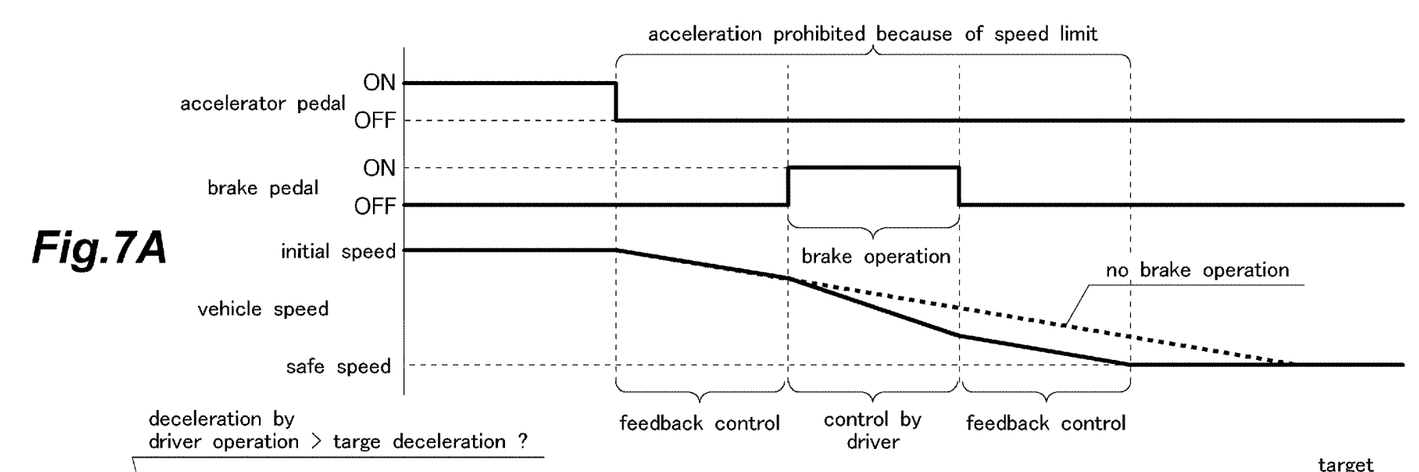
FIGS. 7A and 7B are graphs showing yet another mode of operation of the control device.

In the example shown in FIG. 6B, the initial value of the integral term is controlled at the start of feedback control. More specifically, at the start of feedback control, the initial value of the integral term is set to the target deceleration (eg, $-0.1 \text{ m/s}^2$). This shortens the time period required for the actual deceleration to converge to the target deceleration at the start of feedback control with the result that the responsiveness is improved. Also, in the example shown in FIG. 6B, control action to limit the integral term is performed. Here, control action is performed to limit the lower limit of the integral term. More specifically, the lower limit value of the integral term is set to be near or close to the target deceleration so that the change of the integral term to the acceleration side due to the driver's braking operation is restricted. As a result, accumulation of the integral term is suppressed, so that the time period required for the actual deceleration to converge to the target deceleration is shortened with the result that the responsiveness is improved when switching between the control by the driver's operation and the feedback control.

Figure 7B:
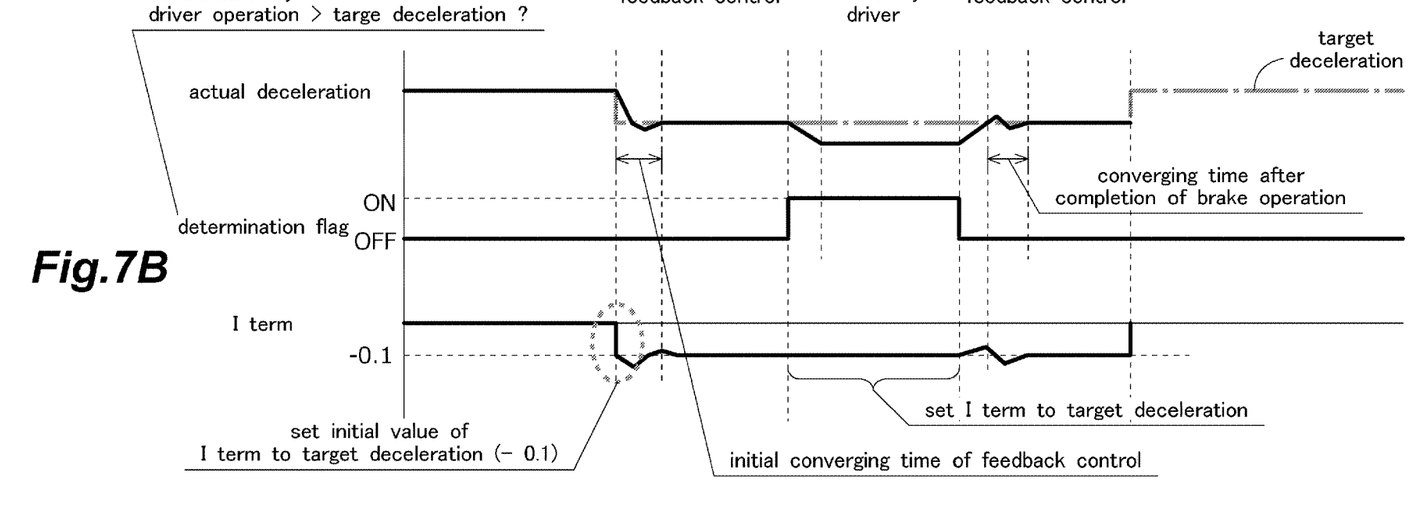

In the example shown in FIG. 7B, control of the initial value of the integral term is performed at the start of feedback control, as in the example shown in FIG. 6B. In the example shown in FIG. 7B, similarly to the example shown in FIG. 6B, control is performed to limit the change of the integral term to the acceleration side. More specifically, when the deceleration due to the driver's braking operation becomes greater than the target deceleration, the integral term is set to the target deceleration. In other words, it is determined if the deceleration due to the driver's brake operation has become greater than the target deceleration, and if or while this determination result or the determination flag is ON, the integral term is set to the target deceleration. As a result, accumulation of the integral term is suppressed, so that the time period required for the actual deceleration to converge to the target deceleration is shortened when switching between the control by the driver's operation and the feedback control with the result that the responsiveness is improved.

This completes the description of the specific embodiment, but the present invention is not limited by the specific embodiment, and can be widely modified without departing from the scope of the present information. In addition, the specific configuration, arrangement, quantity, angle, procedure, etc. of each member and portion can be changed as appropriate within the scope of the present invention. On the other hand, all of the constituent elements shown in the above embodiments are not necessarily essential, and can be selected and substituted as appropriate. The contents of any cited references in this disclosure will be incorporated in the present application by reference. In addition, the present invention can be used not only when the steer-by-wire steering system fails, but also when system performance is degraded due to overheat protection of the steering system, or when an abnormality occurs in which redundancy is lost in a brake-by-wire braking system or in autonomous driving.

The invention claimed is:

1. A vehicle control device configured to be mounted on a vehicle provided with a steering system including an operating member configured to be operated by a driver, a steering member mechanically separated from the operating member and configured to steer a road wheel, and a steering actuator powered by electric power supplied from an onboard power source and configured to actuate the steering member according to an input from the operating member, wherein     the control device is configured to perform a speed limit control to limit a traveling speed of the vehicle below an upper limit speed upon detecting a fault in the steering system, and     the speed limit control is configured to set a target deceleration of the vehicle according to the limited traveling speed, perform a feedback control to bring an actual deceleration of the vehicle to become near the target deceleration,     the feedback control includes an integral term calculated by integrating the difference between the target deceleration and the actual deceleration, and when the deceleration of the vehicle due to a driver's braking operation becomes greater than the target deceleration, the integral term is set to the target deceleration.

2. The vehicle control device according to claim 1, wherein the target deceleration for the feedback control is set as an initial value of the integral term when starting the feedback control.

\* \* \* \* \*